US010600038B2

United States Patent
Lee et al.

(10) Patent No.: US 10,600,038 B2
(45) Date of Patent: *Mar. 24, 2020

(54) SYSTEM AND METHOD FOR FACILITATING PAYMENT FOR A THIRD PARTY'S APPLICATION SUBSCRIPTION

(71) Applicant: WhatsApp Inc., Menlo Park, CA (US)

(72) Inventors: Vicki W. Lee, Palo Alto, CA (US); Eugene Fooksman, Mountain View, CA (US); Brian L. Acton, Palo Alto, CA (US); Michael B. Donohue, Mountain View, CA (US)

(73) Assignee: WHATSAPP INC., Menlo Park, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/723,629

(22) Filed: Oct. 3, 2017

(65) Prior Publication Data

US 2018/0025330 A1   Jan. 25, 2018

Related U.S. Application Data

(63) Continuation of application No. 14/167,527, filed on Jan. 29, 2014, now Pat. No. 9,792,591.

(51) Int. Cl.
*G06Q 20/02* (2012.01)
*H04L 12/24* (2006.01)
(Continued)

(52) U.S. Cl.
CPC .......... *G06Q 20/02* (2013.01); *G06Q 20/102* (2013.01); *G06Q 20/22* (2013.01); *G06Q 20/405* (2013.01);
(Continued)

(58) Field of Classification Search
CPC .... G06Q 20/02; G06Q 20/405; G06Q 20/102; G06Q 30/0207; G06Q 20/22;
(Continued)

(56) References Cited

U.S. PATENT DOCUMENTS

2002/0188844 A1* 12/2002 Yoshinobu ......... G06Q 20/3674
713/163
2004/0181591 A1* 9/2004 Yu .......................... H04L 12/14
709/217
(Continued)

*Primary Examiner* — Cheng-Feng Huang

(57) ABSTRACT

A system, apparatus, and methods are provided for facilitating payment for a third party's use of an application by a current user. The current user, or payor, initiates the process within the application by selecting one or more recipients. The system that hosts the application then determines which of the third parties are eligible. A target recipient may be ineligible because her application subscription never expires, because it doesn't expire within a threshold period of time, or for some other reason. The system identifies the target recipients that are eligible, and the payor may configure the gift payment (e.g., by choosing a duration of the subscription). The payor then chooses a method of electronic payment and, depending on the method selected, may redeem a coupon with the application host system, or the process may complete automatically. The payor and/or the recipient(s) may be notified of successful activation of the subscription(s).

20 Claims, 10 Drawing Sheets

Third-Party In-App Payment

(51) Int. Cl.
*G06Q 20/22* (2012.01)
*H04L 29/06* (2006.01)
*H04L 29/08* (2006.01)
*G06Q 20/40* (2012.01)
*G06Q 20/10* (2012.01)
*G06Q 30/02* (2012.01)

(52) U.S. Cl.
CPC ......... *G06Q 30/0207* (2013.01); *H04L 41/06* (2013.01); *H04L 63/0428* (2013.01); *H04L 63/08* (2013.01); *H04L 63/20* (2013.01); *H04L 67/02* (2013.01)

(58) Field of Classification Search
CPC ..... H04L 63/20; H04L 63/08; H04L 63/0428; H04L 67/02; H04L 41/06

See application file for complete search history.

(56) References Cited

U.S. PATENT DOCUMENTS

| | | | |
|---|---|---|---|
| 2004/0223593 A1* | 11/2004 | Timmins | H04M 3/4878 379/88.02 |
| 2005/0153682 A1* | 7/2005 | Minear | H04L 63/10 455/405 |
| 2006/0218651 A1* | 9/2006 | Ginter | G06F 21/00 726/27 |
| 2009/0081989 A1* | 3/2009 | Wuhrer | G06Q 20/10 455/406 |
| 2009/0171804 A1* | 7/2009 | Lee | G06Q 30/02 705/26.1 |
| 2009/0204525 A1* | 8/2009 | Phillips | G06Q 40/00 705/35 |
| 2012/0036552 A1* | 2/2012 | Dare | H04L 41/0253 726/1 |
| 2012/0071147 A1* | 3/2012 | Prikowitsch | H04M 3/42374 455/417 |
| 2015/0039444 A1* | 2/2015 | Hardin | G06Q 30/0273 705/14.69 |

* cited by examiner

FIG. 1 Communication System 120

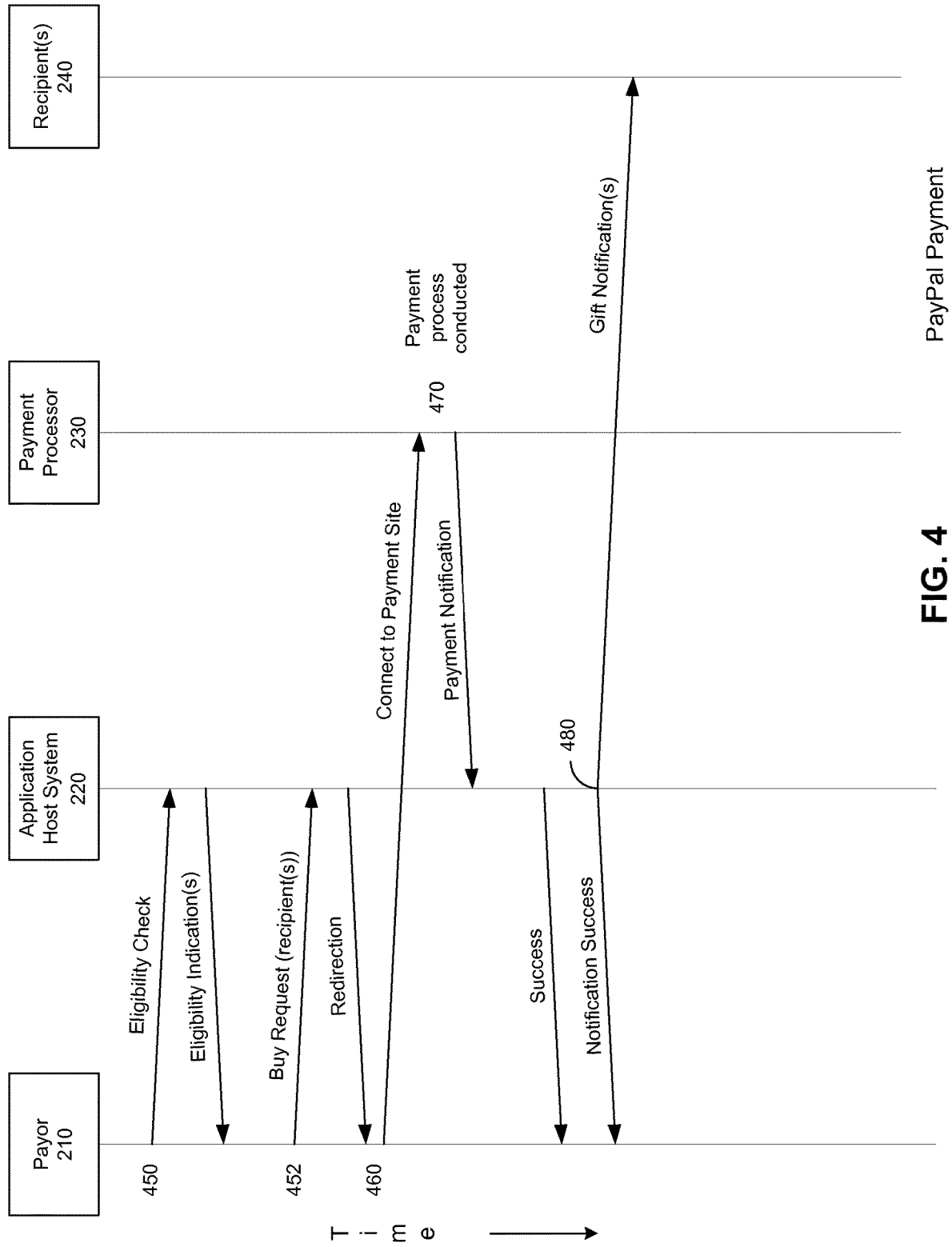

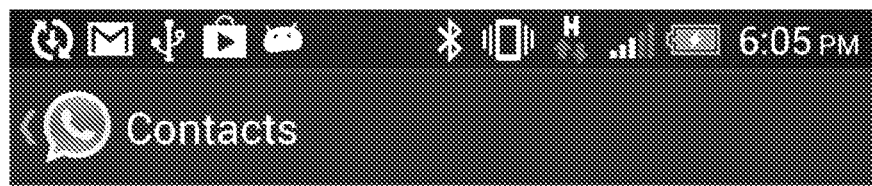
Tell a friend
Pay for a contact
Blocked contacts: None
List of contacts that you have blocked.
Show all contacts
Enable to also use hidden contacts 
Settings Screen 502
FIG. 5A

506

Contact Screen 504

Pay Screen 510 with Confirmation

Notification Screen 520

SYSTEM AND METHOD FOR FACILITATING PAYMENT FOR A THIRD PARTY'S APPLICATION SUBSCRIPTION

RELATED APPLICATIONS

This application is a continuation of, claims the benefit of and priority to previously filed U.S. patent application Ser. No. 14/167,527 filed Jan. 29, 2014, entitled "SYSTEM AND METHOD FOR FACILITATING PAYMENT FOR A THIRD PARTY'S APPLICATION SUBSCRIPTION", which is hereby incorporated by reference in its entirety.

BACKGROUND

This invention relates to the fields of electronic communications and online payments. More particularly, a system, apparatus, and methods are provided for enabling payment for an application subscription by a third party (i.e., a party other than the recipient of the subscription).

Some applications used on mobile communication devices and/or computing devices (e.g., smart phones, portable computers) require payment for continued service. For example, a user of an application may pay a yearly fee to extend his or her use of the application for another year, or just a one-time fee to obtain the application and perpetual rights to use it. Subscription fees and/or other fees for obtaining or using an application on a mobile device are virtually always paid with a credit card or other form of online, electronic payment.

However, many users (and potential users) do not have access to, or the ability to use, electronic payment methods. For example, credit cards are ubiquitous in the United States, but are not so popular in other countries. Further, some online payment services are not offered in some countries, due to regulatory restrictions, lack of a market, or for some other reason.

Therefore, in some countries or regions, potential users are prevented from purchasing or subscribing to some applications.

SUMMARY

In some embodiments of the invention, a system, apparatus, and methods are provided for facilitating or enabling payment for a particular user's use of an application by a third party (e.g., another user of the application).

In these embodiments, a payor or originator of payment for a subscription for one or more third-party recipients initiates the payment within the application. The payor may easily select multiple recipients by selecting a group of recipients that was pre-formed for some other reason (e.g., for group chat communications). After selecting the target recipient(s), a system that hosts the application determines which of them are eligible.

Illustratively, a target recipient may be ineligible because her subscription never expires, because it doesn't expire within a threshold period of time (e.g., one year, three years), or for some other reason. The system may also verify that the originator is eligible to pay for a third-party, possibly by ensuring at least one electronic form of payment is available to him, determining whether he has rolled back or rescinded one or more previous third-party payments, etc.

The system identifies to the payor those target recipients that are eligible, and the payor may configure the gift payment by choosing a duration of the subscription, a message to pass to the recipients, making the gift anonymous, etc. The payor then chooses a method of electronic payment and, depending on the method selected, may redeem a coupon with the application host system, or the process may complete automatically. The payor and/or the recipient(s) are notified of successful completion and activation of the subscription(s).

DESCRIPTION OF THE FIGURES

FIGS. 2-4 are time sequence diagrams illustrating methods of facilitating a third-party payment of an online subscription, in accordance with some embodiments.

FIGS. 5A-E are screen shots depicting some portions of a process of facilitating payment for a third party's use of an application, in accordance with some embodiments.

DETAILED DESCRIPTION

Figure 1:
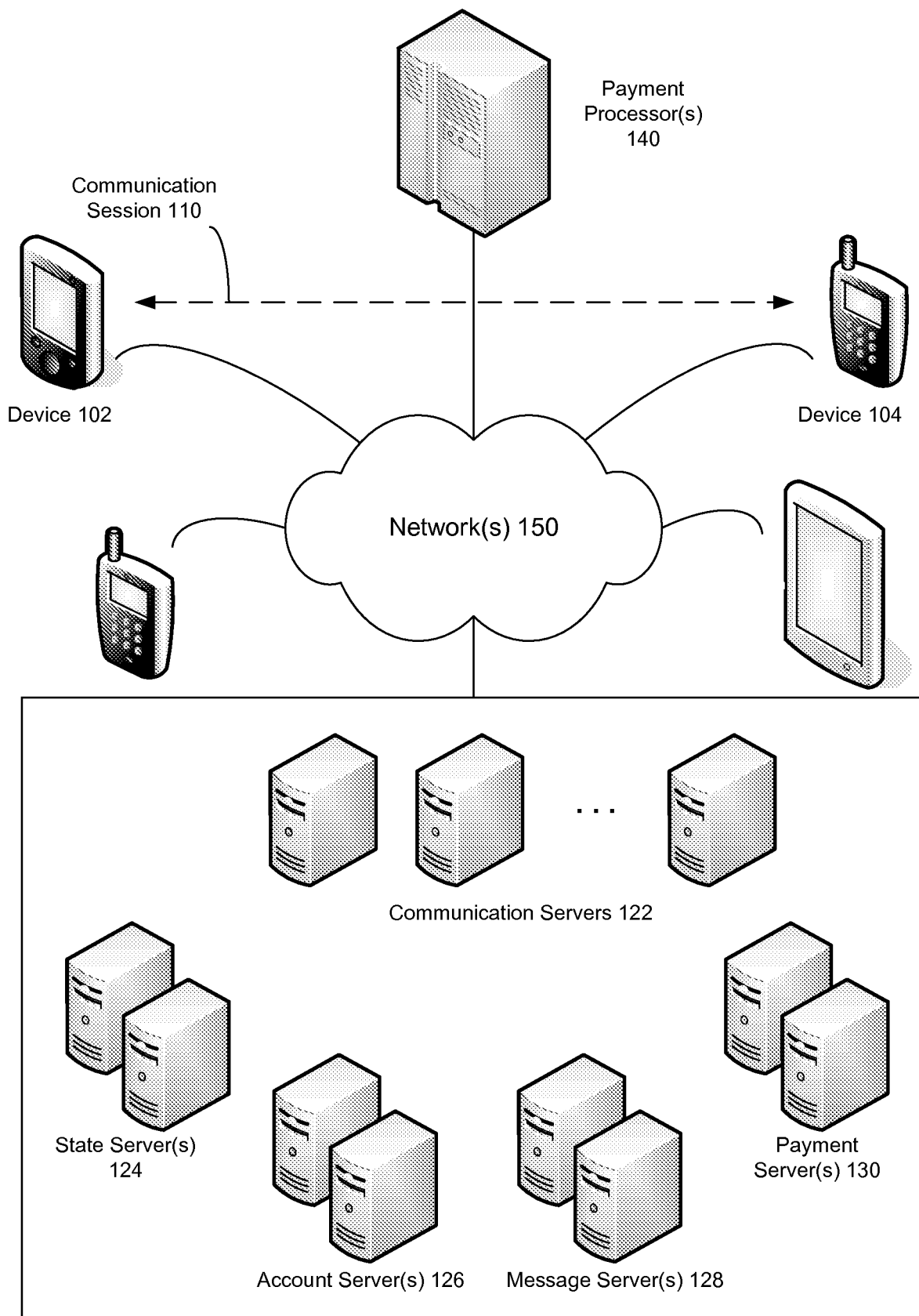
FIG. 1 is a block diagram depicting a communication environment in which some embodiments may be implemented.

The following description is presented to enable any person skilled in the art to make and use embodiments described herein. Various modifications to the disclosed embodiments will be readily apparent to those skilled in the art, and the general principles defined herein may be applied to other embodiments and applications without departing from the scope of the present disclosure.

In some embodiments, a system, apparatus, and methods are provided for enabling and facilitating payment, by one user of an application (e.g., a mobile application, a cloud-based application), for use of the application by a third party (i.e., another person). Although these embodiments are discussed below as they may be implemented when the third party is a current user of the application, in alternative implementations the third party may not be a current user. The third party may alternatively be termed a "benefactor," "beneficiary," or "recipient" of such a payment, or may be identified using other terms. The user who pays for a third party's use of the application may be termed the "payor," "gifter," or "originator" of the payment, or may be identified using other terms.

The method of payment employed by the payor may include any payment mechanism accepted by the application provider or by a payment processor that receives payment on behalf of the application provider. By way of illustration, and not limitation, available payment mechanisms or means may include credit cards, PayPal®, Google Wallet™, electronic checks, wire transfer, and/or other mechanisms now known or hereafter developed.

Thus, in some embodiments described herein, a third party in-application (or "in-app") payment option is provided. In-app payments (i.e., payments made for use of an application from within the application) generally can only be made by a user for himself or herself. That is, a user of a mobile application may be able to make an in-app payment for his or her use of the application, but cannot make an in-app payment on some other user's behalf, at least not without requiring some action by that other user (e.g., redemption of a token or a coupon).

The application for which service or a subscription is purchased may execute on a smart phone, a personal digital assistant, a portable computing device, a desktop computer, and/or some other type of communication device or computer. In some particular embodiments, the application is a communication application in which text, images, video, voice recordings, and/or other electronic information are exchanged via data communication channels conforming to an IEEE 802.11 standard (e.g., Wi-Fi® connections). For example, the application may be the WhatsApp® Messenger application provided by WhatsApp Inc.

In these embodiments, rather than relying upon traditional wireless voice communication channels that provide limited support for transmission of instant or real-time communications other than live voice conversations, the data communication channels allow unconstrained exchange of virtually all types of communications and media between devices of the same and/or different types.

In other embodiments, the application for which a payor pays for a third party's use or subscription may be another type of application that does or does not facilitate communications between users, such as a media player, a game, a social networking application, a photo-sharing application, etc.

FIG. 1 is a block diagram of a system for facilitating payment for a third party's use of an application, according to some embodiments.

In these embodiments, users of communication system 120 operate a variety of portable communication devices operating the same or different operating systems. Thus, devices 102, 104 are operated by different users, and may be configured similarly or very differently in terms of functionality, applications, utilities, etc. Each of them, however, executes a version of a common communication application hosted by communication system 120. Illustrative communication session 110 between devices 102, 104 comprises separate connections between device 102 and system 120 and between device 104 and system 120.

System 120 is a data center, computer network, or other cooperative collection of computer resources for hosting a communication application or service that can be used simultaneously by multiple users, or at least a server portion of such an application or service. As described above, in some implementations, the application provides a user with instant messaging of text, audio recordings, photos, video, and multimedia from his or her communication device (e.g., device 102), to/from communication devices operated by one or more other users (e.g., device 104).

The communication application hosted by system 120 is compatible with devices 102, 104 and includes client logic executed under the devices' native operating systems. A user operating one type of device and subscribing to one communication server provider can exchange messages with users operating other types of devices and subscribing to other communication service providers. Thus, the originator of payment for a third party's use of the application may use one device platform, while a recipient uses a different platform.

Individual messages conveyed by the application may be sent to any number of recipients; for example, a group form of communication (e.g., chat) may be offered in which multiple users interactively exchange instant communications. Similarly, a payor may pay for application subscriptions for one or more third parties—such as one family member, multiple friends, all (eligible) members of a group, etc.

Communication servers 122 are front-end components of system 120. They host users' connections with the system and facilitate the exchange of communications between users. Servers 122 may be referred to as "chat" servers, in that they receive real-time messages and chat session communications from individual users for delivery to one or more other users. Although messages handled by communication servers 122 may be termed "chat" messages, they are not limited to textual content and may instead (or also) contain embedded, attached, or associated (e.g., linked) media content.

Communication servers 122 may also act as portals to other components of system 120. Thus, when a user requests a status of another user, initiates payment for another user's application subscription, or initiates some other action with system 120 besides exchanging a communication with another user, his or her action may be routed to the appropriate system component by the communication server with which he or she is connected.

Illustratively, as long as a user is on-line with system 120 and the application is executing on his or her device, a connection or session may be maintained between the device and a communication server 122. When the user closes the application on the device, his or her connection may persist for some period of time (e.g., five minutes, fifteen minutes).

State servers 124 maintain states or statuses of users and/or users' devices. Thus, a state server stores some or all of a user's profile, including applicable preferences (e.g., preferred audible and/or visual alert, status message displayed to other users), device type/model, expiration of service, etc. Some status information maintained by a state server with regard to a user may persist only for the duration of the user's current connection with system 120. As the user's device operates in different ways or different modes, goes offline, comes online, and so on, a state server may or may not capture or retain those changes.

In some embodiments, as part of a user profile retained on a state server, identities of other users associated with that user may be maintained, and possibly their statuses. These other users may be informed of some or all changes in the user's status (or the changes in the status of the user's device)—such as when she comes online and when she goes offline. State server(s) 124 may also determine, or help determine, the eligibility of a target or potential recipient of a third-party payment. An account server 126, possibly in conjunction with a state server (or some other system component described here) may inform a given user (e.g., a user of device 102) when another user's subscription to, or use of, the communication application is due to expire, or may respond to the given user's query regarding whether he or she may pay for the other user's continued use of the application.

Account servers 126 store data regarding statuses of users' subscriptions for use of the application. The account servers may also track and enforce service expirations, identify users whose service is within some threshold period of time prior to expiration (e.g., three months, one year, three years), and/or have other responsibilities relevant to payment for a third party's application subscription. Each time a user's service is paid for (e.g., by renewing or extending a subscription), a payment server 130 may be responsible for applying payment to the correct user's account.

Message servers 128 store communications that cannot immediately be delivered to their target or destination users. A new message (e.g., a chat message) received for a user who is currently on-line with system 120 can be delivered immediately (i.e., through the user's open connection with a communication server 122). However, a message received for a user who is currently off-line (i.e., does not have an open connection with a communication server 122), or at least a textual portion of such a message, may be stored on a message server 128 until it can be delivered. Media sent by one user to another may be stored on a message server or some other server (e.g., a media server not pictured in FIG. 1).

Any number (e.g., one or more) of communication servers, state servers, account servers, message servers, payment servers, and/or other servers may be deployed within system 120. The functions of servers 122, 124, 126, 128, 130 may be distributed differently in other embodiments, such as by being merged into fewer components or divided among additional components.

The servers of system 120 may be separate physical computer systems comprising distinct hardware resources (e.g., processor, storage, communication interface) and software resources (e.g., program code, data) suitable for performing the functions ascribed to them. In some alternative embodiments, any or all of the servers may be virtual computing machines that share hardware and/or software resources. Thus, multiple software server modules performing different functions may reside on one server computer.

Payment processor(s) 140 represent the systems or mechanisms for processing payment for an application hosted by system 120, other than payment mechanisms implemented within system 120. Thus, depending on the configuration of a user's device (the operating system it uses), how the application was installed on the device (e.g., directly from system 120, via a marketplace, whether the user has an account established with an online payment service, and/or other factors, any number of payment processors (i.e., one or more) may be available to the user.

In some illustrative embodiments, payment processor(s) 140 may include a system employed by a marketplace or vendor of applications. These may be referred to as in-app payment processors, because they may be employed within the application for which payment is being made, without visiting another site (e.g., a web site associated with some other entity).

In some other illustrative embodiments, payment processor(s) 140 may include a digital wallet or a credit card payment processor. In these embodiments, a payor may be directed to a web site associated with the payment processor, or an affiliate of the payment processor, to complete payment.

When a user wishes to pay for a third party's use of an application hosted by system 120, he or she accesses a suitable interface provided with the application to identify the third party (e.g., by telephone number), determine whether that third party is eligible for a gift, configure the gift (e.g., for one year, three years, five years), and initiate the payment. In some implementations, any application user whose current subscription ends within some period of time from the present date (e.g., six months, one year, three years) is eligible to have his or her subscription extended by another user. This limit may prevent unwarranted (e.g., excessively long) subscription periods from being accumulated. In other implementations, other criteria may be applied to determine whether a particular third party is eligible.

When the originator initiates payment, that payment may be conducted according to the procedures implemented by the selected payment mechanism—such as through a payment processor 140. During or after the payment process, system 120 is informed of whose service has been paid for (i.e., the third party), who paid for the service (i.e., the payor), and the length of the service that was paid for. Either, both, or neither of the payor and the third party may receive notification of the transaction. Detailed descriptions of methods of paying for a third party's subscription are provided below.

Network(s) 150 comprise communication paths between system 120, users' devices and payment system 140, and may include data and/or voice communication channels. For carrying data communications, networks 150 may comprise the Internet, one or more intranets, LANs (Local Area Networks), WANs (Wide Area Networks), and/or other point-to-point or distributed connections, which may be wired and/or wireless in nature. For carrying voice communications, network(s) 150 may comprise wired and/or wireless voice communication links managed by different telecommunication service providers and implementing virtually any wireless technology, such as Global System for Mobile Communications (GSM), Enhanced Data Rates for GSM Evolution (EDGE), Long-Term Evolution (LTE), Code Division Multiple Access (CDMA), Evolution-Data Optimized (EV-DO), and soon.

Networks 150 may thus comprise various entities not shown in FIG. 1, such as routers, gateways, switches, base stations (e.g., wireless access points, Node Bs, Evolved Node Bs), and/or other equipment for establishing, maintaining, switching, or otherwise manipulating a data and/or voice connection.

Figure 2:
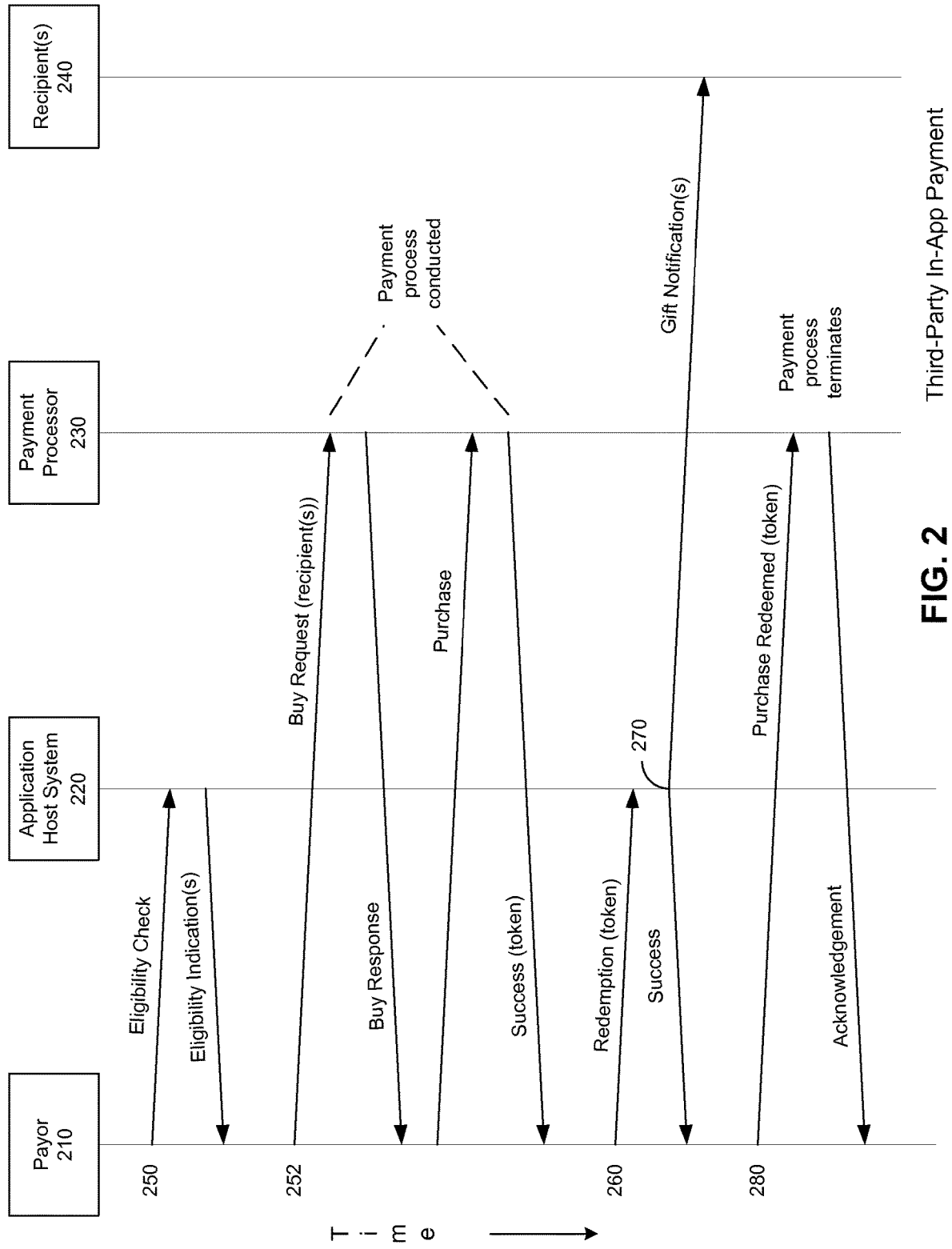
Figure 3:
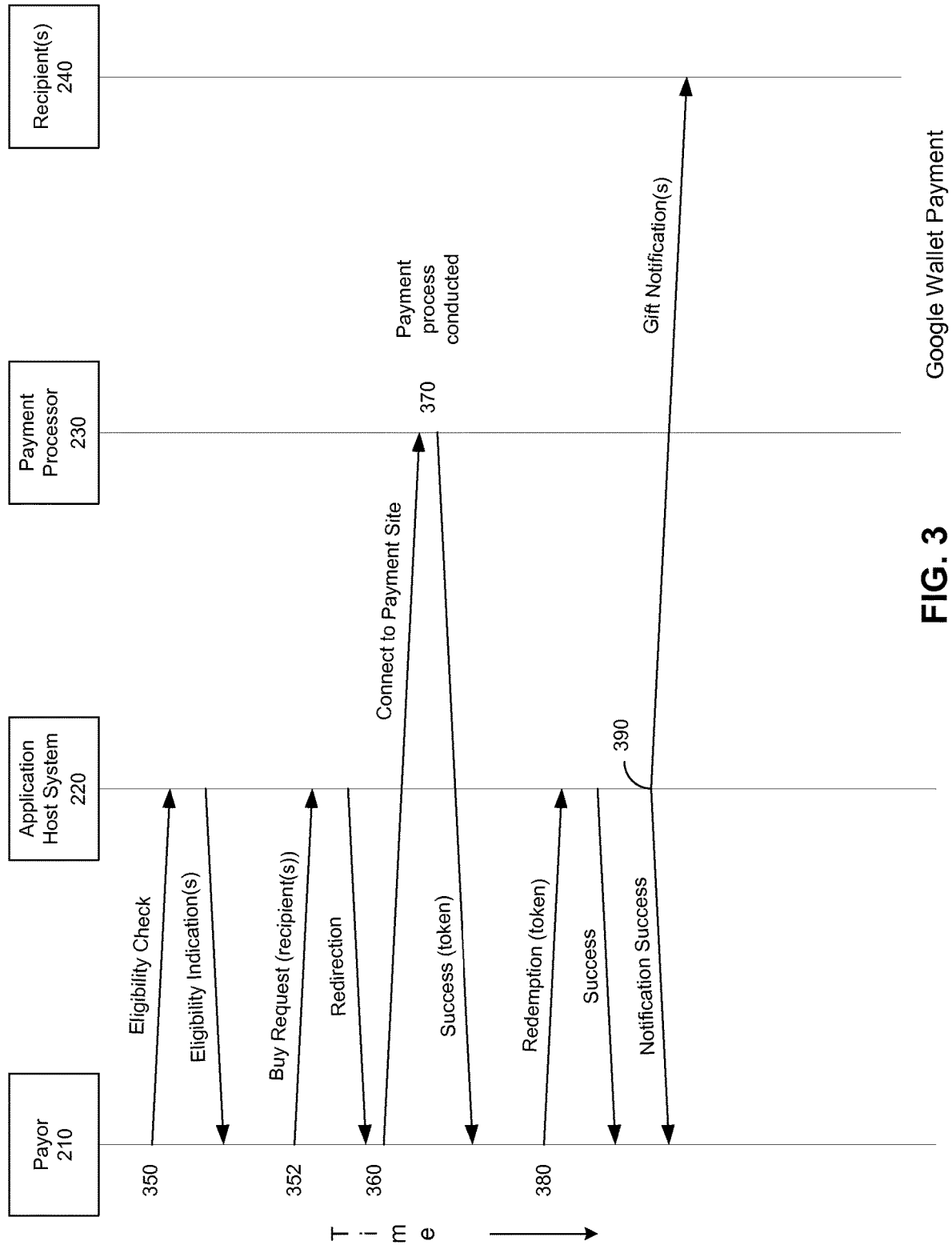

FIGS. 2-4 are time sequence diagrams illustrating methods of facilitating payment of a third party's application subscription, according to some embodiments.

In these embodiments, a payor 210 operates a first client device (e.g., a smart phone, a computing device) to purchase or extend usage of an application by one or more recipients 240 operating other client devices. The application is hosted, operated, or otherwise managed by application host system 220, which may be communication system 120 of FIG. 1 in some implementations. Payment processor 230 is a system or mechanism for paying for subscriptions to the application. Each of FIGS. 2-4 encompasses the use of different payment processors.

FIG. 2 reflects an in-app payment by payor 210, and so payment processor 230 is some marketplace or electronic store from which the payor can purchase or extend usage of (e.g., a subscription for) the application.

At time 250, the payor activates a control within the application that allows him to initiate payment for a third party. As described further below, such a control may be provided within multiple portions of the application, such as a dedicated interface for paying for third parties, a contact list identifying the payor's contacts, a status screen that identifies associates of the payor whose subscriptions are expiring, etc.

Upon activation of the control, the payor's device transmits an 'eligibility check' communication or signal to application host system 220. This communication indicates that the payor is interested in making a payment for one or more identified third parties. In these embodiments, the payor and recipient(s) are identified using only telephone numbers. In some other embodiments, other indicia, such as names, nicknames, etc., may be used to identify or disambiguate users. Actions described herein as being performed by the payor's device (or a recipient's device), are executed under control of the application provided by host system 220, as it operates on the device, and/or logic associated with payment processor 230.

System 220 receives the signal (e.g., at a communication server) and, for each identified target recipient, determines whether a subscription can be extended (if the recipient already has a subscription) or created (if the recipient does not currently use the application).

The former examination may entail identifying an expiration of the recipient's current service (if there is one) and determining whether it is within some predetermined period of time from the present date (e.g., six months, one year, two years). Illustratively, if the target recipient's subscription does not expire, or does not expire within the predetermined period of time, she may be considered ineligible to receive a third-party payment, so as not to allow excessive subscription lengths that may never be used. This examination may be satisfied entirely within system 220, by consulting appropriate system components (e.g., an account server, a state server). In the illustrated embodiment, the payor is not informed of the expiration of any target recipient's application usage.

The latter examination may entail identifying a type of device associated with the target recipient's telephone number, determining whether a version of the application is available for that device, determining whether the recipient is barred from use of the application, checking a do-not-call list or other collection of information identifying telephone numbers or people who do not wish to receive unsolicited offers/gifts, identifying other applications/services provided to the target recipient (e.g., to determine whether the recipient may be a minor or may require another party's approval to install an application), and/or other processing. This examination may require interaction with entities external to system 220, such as the target recipient's telephone service provider, a repository of blocked or restricted telephone numbers, etc.

In some embodiments, a payor cannot pay for a third party's use of the application unless that third party already has a subscription. In these embodiments, therefore, initial subscriptions cannot be created.

After determining the target recipients' eligibilities, the system responds to payor 210 with an 'eligibility indication(s)' communication that identifies those intended recipients who are eligible to have a third-party payment made on their behalf. The payor may also be specifically informed of target recipients who are not eligible. Payor 210 may or may not be informed of the reason or reasons why a given target recipient is ineligible.

In some implementations, not all eligibility responses may be provided together. For example, if system 220 must consult with other entities to determine a target recipient's eligibility (e.g., for an initial subscription), the system may issue multiple eligibility indications as it makes its determinations.

At time 252, and assuming that at least one target recipient was deemed eligible for payment by a third party, the payor's device initiates the payment process by sending an appropriate signal to payment processor 230, which may depend upon the entity acting as the payment processor. For example, the 'buy request' communication, which identifies the approved recipients (by telephone number) and which may include other information to identify what is being purchased (e.g., SKU or Stock Keeping Unit), may be a message with the necessary parameters that is formatted according to the communication protocol implemented by the payment processor.

Payment processor 230 will acknowledge the request with a 'buy response' communication, which is configured according to the payment processor's communication protocol.

The payor's device automatically implements the purchase by sending a 'purchase' communication. The payment processor acknowledges the successful purchase by returning a 'success' communication that conveys a token for the payor to redeem.

At time 260 (e.g., immediately upon receipt of the token), the payor's device (automatically) sends a 'redemption' communication to application host system 220, with the token supplied by payment processor 230. In some embodiments, the token identifies the recipients of the payor's gift, configuration of the gifts (e.g., duration of subscription renewal, amount paid, a message to deliver with notification of the gift), and/or other information. This information may be hashed, encrypted, or otherwise altered to protect it and/or to promote verification of the communication and/or authentication of the payor.

Upon receipt, system 220 may or may not verify the token or its content (e.g., by contacting the payment processor). At time 270, system 220 accepts the token and issues a 'success' communication to payor 210 to inform him that his payment for the specified third party or third parties was successful. The system also initiates 'gift notification' communications to the third parties whose subscriptions have been extended or created. The confirmation message to payor 210 and the gift notifications need not be sent simultaneously.

To finalize the payment process, the payor's device may send a 'purchase redeemed' communication to payment processor 230, with the token that has been redeemed. The payment processor terminates the payment process with a final 'acknowledgement' or success communication.

One of ordinary skill in the art will realize that the payment process applied may differ from one payment processor to another, and thus the content, format, and order of communications that involve payment processor 230 may vary from one implementation of the illustrated method to another. In these implementations, however, a third-party in-app payment is executed in which payor 210 (or the payor's device) identifies one or more gift recipients and interacts with system 220 and payment processor 230 as necessary to implement the gift(s), without any action required by the recipients whose subscriptions have been purchased or extended.

In some implementations, however, a message or interface presented to a gift recipient may include one or more controls for acknowledging the message, responding to the payor (e.g., to send a "thank you" message), declining the gift, or taking other action. If the gift is declined, the payment may be unwound (if possible), or the payor may be prompted to identify a different recipient or to apply the gift to his own subscription.

A control for responding to the payor may be activated to open a communication (e.g., chat) session with the payor, and/or may open a pre-formatted message that thanks the payor for the gift (and that may be editable by the recipient).

The payor may only need to take one or two actions—initiate the eligibility check (by identifying the target recipients and activating a control) at time 250 and execute the purchase at time 252, but the latter may be performed automatically in some embodiments.

Illustratively, the gift notification communications may inform the recipients that their subscriptions have been renewed or extended, may identify the new expiration date, and may identify payor 210. In embodiments in which the application is a communication application (e.g., an application provided by communication system 120 of FIG. 1), the gift notifications may be delivered via the application.

If an initial subscription was purchased for a non-user of the application, her gift notification may be sent via instant message, electronic mail, or some other mechanism. This notification may provide a URL (Uniform Resource Locator) or other link or control that she may activate on her device to be connected to application host system 220 (e.g., a communication server) and activate her subscription.

FIG. 3 reflects the use of a digital wallet payment by payor 210, and so payment processor 230 is a web site associated with the digital wallet.

At time 350, the payor activates a control within the application that allows him to initiate payment for a third party, and which may be available within one or more interfaces, pages, or features of the application. This control may be configured according to the digital wallet specifications.

Upon activation of the control, the payor's device transmits an 'eligibility check' communication or signal to application host system 220 that indicates that the payor is interested in making a payment for one or more identified third parties. The payor and recipient(s) are identified using telephone numbers (and possibly other indicia, such as names, nicknames, etc.).

System 220 receives the signal and, for each identified target recipient, determines whether a subscription can be extended or created. In embodiments in which third party subscriptions can only be extended or renewed (i.e., no initial subscriptions), the payor can only make payments on behalf of current users of the application, and possibly past users who still have the application installed on their devices but do not currently have subscriptions.

After determining the target recipients' eligibilities, the system responds to payor 210 with one or more 'eligibility indication' communications that identify those intended recipients who are eligible to have a third-party payment made on their behalf, and/or those who are not eligible. Payor 210 may or may not be informed of the reason or reasons why a given target recipient is ineligible.

At time 352, the payor's device (automatically or upon action by the payor) opens a browser connection (e.g., via HTTPS or HyperText Transport Protocol Secure) with application host system 220 to initiate the payment process. The 'buy request' communication in this embodiment may therefore be activation of a URL identifying a predetermined component of the system (e.g., a web server, an account server), and may convey information such as the recipients' identities (e.g., telephone numbers), payor's identity, what is being purchased (e.g., by SKU), etc. Illustratively, the application as it executes on the payor's device may be programmed to correctly configure a URL based on the payor's selection of the third parties, duration of subscription extensions, method of payment, etc.

Because the payor has specified the digital wallet as the payment mechanism, system 220 redirects the payor's connection to payment processor 230 at time 360, which causes the payment process to be performed at time 370. Successful completion of the payment process causes a 'success' communication to be returned to payor 210 from payment processor 230, with a token to be redeemed.

At time 380 (e.g., immediately upon receipt of the token), the payor's device (automatically) sends a 'redemption' communication to application host system 220, with the token supplied by payment processor 230. In some embodiments, the token identifies the recipients of the payor's gift, configuration of the gifts (e.g., duration of subscription renewal, amount paid), and/or other information. This information may be hashed, encrypted, or otherwise altered to protect it and/or to promote authentication.

Upon receipt, system 220 may or may not verify the token or its content (e.g., by contacting the payment processor). Assuming any required verification, authentication, or other safeguard is satisfied, system 220 then accepts the token and issues a 'success' communication to payor 210 to inform him that his payment for the specified third parties was successful.

At time 390, the system initiates 'gift notification' communications to the third parties whose subscriptions have been extended or created. At or about the same time, application host system 220 sends a 'notification success' communication to payor 210 to inform him that the gift(s) have been applied within application host system 220. The confirmation message to payor 210 and the gift notifications need not be sent simultaneously. A gift notification communication may include one or more controls the recipient may activate to respond to the gift.

One of ordinary skill in the art will realize that the payment process applied may differ from one payment processor to another, and thus the content, format, and order of communications that involve payment processor 230 may vary from one implementation of the illustrated method to another. In methods corresponding to FIG. 3, however, no action is required by the recipients whose subscriptions have been extended.

FIG. 4 reflects use of a digital payment service by payor 210, and so payment processor 230 is a web site associated with the digital payment service.

At time 450, the payor activates a control within the application that allows him to initiate payment for a third party, and which may be available within one or more interfaces, pages, or features of the application. This control may be configured according to the digital payment service's specifications.

Upon activation of the control, the payor's device transmits an 'eligibility check' communication or signal to application host system 220 that indicates that the payor is interested in making a payment for one or more identified third parties. The payor and recipient(s) are identified using telephone numbers (and possibly other indicia, such as names, nicknames, etc.).

System 220 receives the signal and, for each identified target recipient, determines whether a subscription can be extended or created. In embodiments in which third party subscriptions can only be extended or renewed, the payor can only make payments on behalf of current users of the application, and possibly past users who still have the application installed on their devices but do not currently have subscriptions.

After determining the target recipients' eligibilities, the system responds to payor 210 with one or more 'eligibility indication' communications that identify those intended recipients who are eligible to have a third-party payment made on their behalf, and/or those who are not eligible. Payor 210 may or may not be informed of the reason or reasons why a given target recipient is ineligible.

At time 452, the payor's device (automatically or upon action by the payor) opens a browser connection (e.g., via HTTPS) with application host system 220 to initiate the payment process. The 'buy request' communication in this embodiment may therefore be activation of a URL to a predetermined component of the system (e.g., a web server, an account server), and may convey information such as the recipients' identities (e.g., telephone numbers), payor's identity, what is being purchased (e.g., by SKU), etc. Illustratively, the application as it operates on the payor's device may be programmed to correctly configure a URL based on the payor's selection of the third parties, duration of subscription extensions, method of payment, etc.

Because the payor has specified the digital payment service as the payment mechanism, system 220 redirects the payor's connection to payment processor 230 at time 460, which causes the payment process to be performed at time 470.

Upon successful completion of the digital payment service payment, payment processor 230 issues a 'payment notification' communication to application host system 220. This communication (e.g., an instant payment notification) will convey information regarding the payor's purchase—such as identities of the recipients and payor (e.g., telephone numbers), durations of the subscription extensions, amount paid, a message to deliver to the recipients, etc.

Assuming any required verification, authentication, or other safeguard is satisfied, system 220 then issues a 'success' communication to payor 210 to inform him that his payment for the specified third parties was successful.

At time 480, the system initiates 'gift notification' communications to the third parties whose subscriptions have been extended or created. At or about the same time, application host system 220 sends a 'notification success' communication to payor 210 to inform him that the gift(s) have been applied within application host system 220. The confirmation message to payor 210 and the gift notifications need not be sent simultaneously. A gift notification communication may include one or more controls the recipient may activate to respond to the gift.

One of ordinary skill in the art will realize that the payment process applied may differ from one payment processor to another, and thus the content, format, and order of communications that involve payment processor 230 may vary from one implementation of the illustrated method to another. In methods corresponding to FIG. 4, however, no action is required by the recipients whose subscriptions have been extended.

Methods depicted in FIGS. 2-4 reflect the use of illustrative payment mechanisms. One of ordinary skill in the art will appreciate that other payment processors and methods of payment may be employed in other embodiments, without exceeding the scope of the invention. Also, additional communications not illustrated in the Figures may be conducted, to acknowledge another communication, perform authentication, verify received information, to satisfy requirements of a payment protocol, etc.

External entities (e.g., an application marketplace) may control at least part of the payment processes used to make third- party subscription payments. For this reason, and/or others, the order and nature of the various communications represented in FIGS. 2-4 may differ in alternative embodiments.

For example, a payment processor may specify or require the use of a particular payment protocol and/or a specific message format, and the application will be modified as necessary so that a device operated by payor 210 to make a payment will meet those requirements.

Some (or all) communications depicted in FIGS. 2-4 may be encrypted, and/or information they convey may be protected or obscured. For example, a given telephone number (e.g., of payor 210, of a recipient 240) may be transmitted in the clear, may be encrypted, may be hashed, may be replaced with a substitute identifier, etc.

As mentioned above, indifferent embodiments a potential originator of a subscription payment on behalf of a third party may initiate the payment in different ways. Illustratively, the originator may first choose the action (i.e., to pay for a third party's subscription) and then identify the recipient(s), or may first choose the recipient(s) and then specify the action.

For example, from a "Settings" screen or menu of options of the application, such as Settings screen 502 of FIG. 5A, an originator may be able to choose an action entitled "Pay for a Friend," "Pay for a Contact," or something similar, by activating an associated control. The originator would then be offered the opportunity to select one or more recipients.

Or, within a contact list identifying friends, associates, other people with whom the originator has communicated via the application (or external to the application), and/or other users of the application, the originator may be able to select or mark one or more contacts and then activate a control designed to initiate the process of paying for their use of the application. Yet further, when the originator pays for his own application usage, he may be offered a control or option for paying or offering to pay for someone else.

Figure 5B:
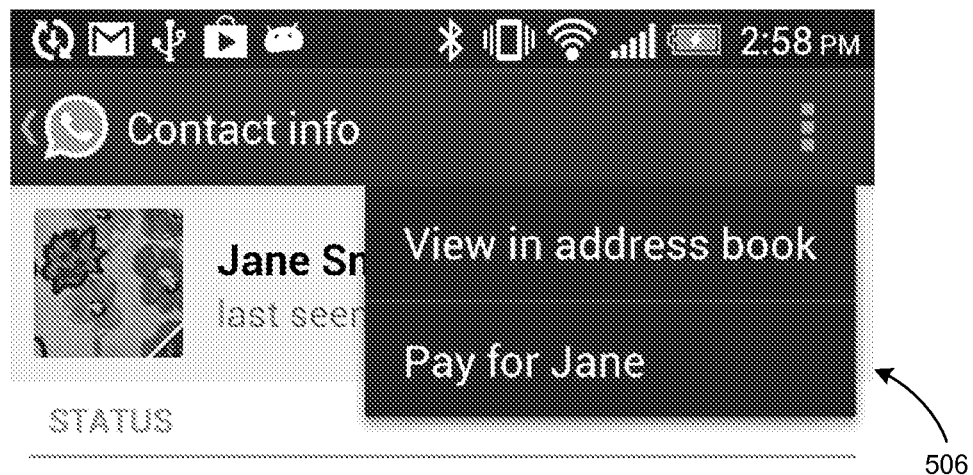

In some implementations, the application provides a screen or interface, such as Contact screen 504 of FIG. 5B, for viewing information about one contact at a time—such as the last time the contact was connected to the application host system, the contact's current status, media (e.g., photos) received from or sent to the content, a telephone number and/or another method of reaching the contact, etc. This interface may offer an option to pay for the contact's use of the application (e.g., option 506). Illustratively, this interface may be opened or offered to the originator when he selects the contact from a contact list, when he is engaged in a communication with the contact (e.g., a chat session), etc.

Thus, the originator can initiate a process of paying for a third party's use of an application via one or more entry points within the application. In some embodiments, he may also be able to initiate the process by navigating a web browser to a web site associated with a provider or host of the application.

In some embodiments, a user of the application may select with a single action multiple recipients for receiving gift subscriptions or subscription extensions. For example, if the application supports activities by a user-defined group of people—such as group chat—the user may select the group as a recipient of his gift. The application host system will automatically separate group members who are not eligible, and allow payment for the remaining group members to proceed.

In some other embodiments, when an originator activates an application function to initiate payment for a third party, before selecting the recipient(s), such as when the originator views an interface configured to allow the originator to choose the recipients, only eligible recipients may be listed. In other words, ineligible parties may not even be offered as potential recipients. This would eliminate the need to check potential recipients' eligibilities after the originator commences the process.

In yet other embodiments, a potential originator of a payment for a third party that is not currently eligible may request notification when that party becomes eligible to receive a gift subscription. Alternatively, the system may automatically notify the originator.

Also, a user may request payment of his or her subscription, in which case a corresponding alert may be displayed to friends and associates of that user, and/or other users. For example, in other users' contact lists (e.g., within the application), an entry for the requesting user may be highlighted or marked (e.g., with an icon) indicating that he or she is soliciting a gift subscription. Conversely, a user may express a willingness to pay for subscriptions for some or all of her contacts, for members of a particular group, or for specific other users, without actually initiating the third-party payment process. In this case, those other users (or at least those users who are eligible) will be notified and any or all of them may accept her offer, which may then be executed automatically or only after she approves the payment.

After an originator indicates his desire to purchase a gift subscription, and identifies the recipient, or identifies the recipient and then chooses to pay for a subscription, and as explained in conjunction with FIGS. 2-4, the originator's device contacts the application host system (or some other authority) to determine if the target recipient is eligible. If the target recipient is not eligible, the originator is not able to proceed with the payment process, and may or may not be told the reason that person is ineligible.

Figure 5C:
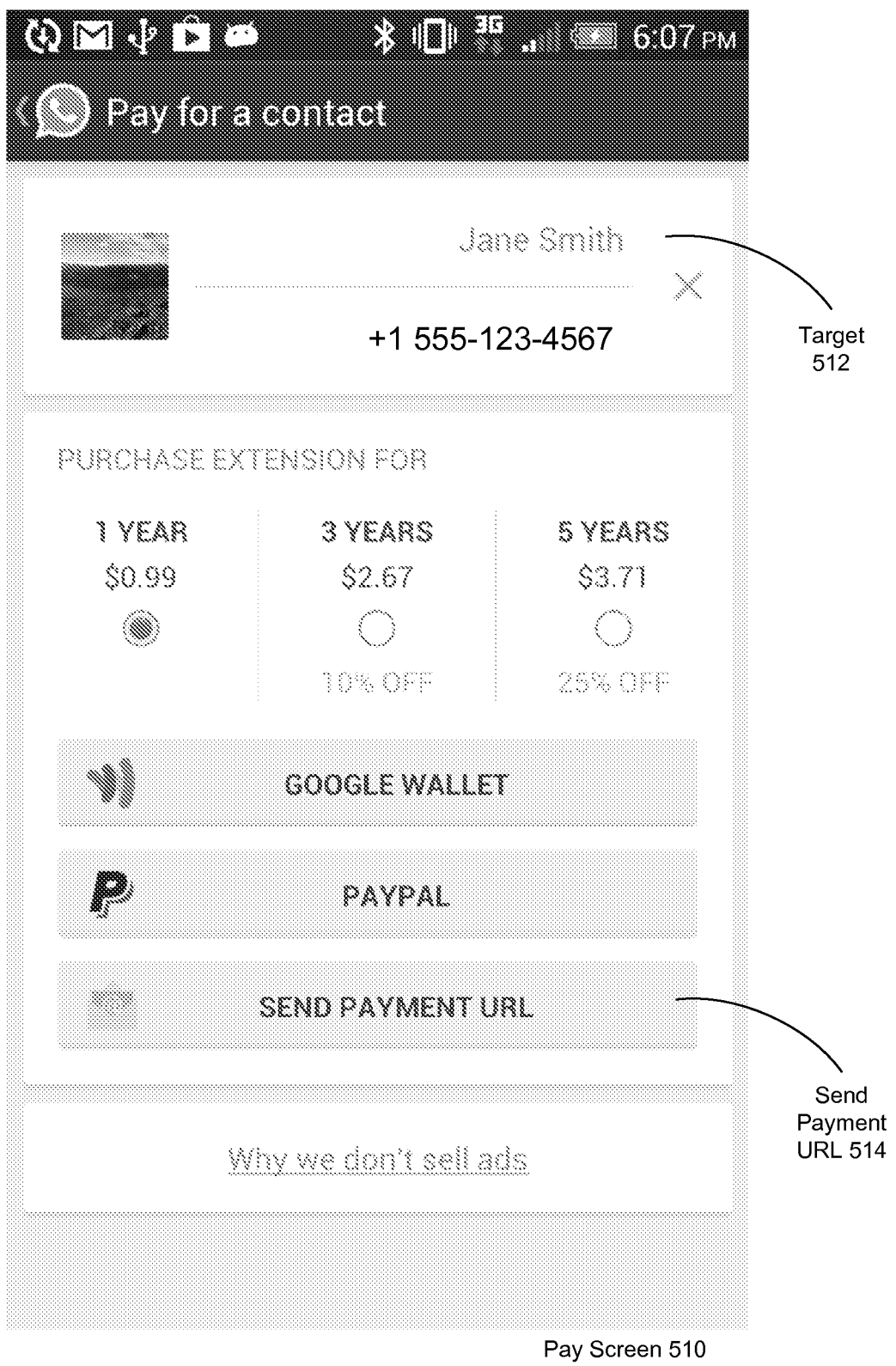

If the target recipient is eligible, an interface such as Pay screen 510 of FIG. 5C is displayed. In this interface, the selected recipient is identified as target 512, with the telephone number of her device. This interface allows the originator to configure the gift, such as by selecting a duration of the subscription (or subscription extension), and offers one or more payment options supported by the originator's device.

Send payment URL control 514, if activated, allows the originator to forward a URL that, when clicked, initiates the payment process. Illustratively, the originator may use control 514 to forward the URL to a different device (e.g., a desktop computer), so that the payment process may be executed from there instead of from his mobile device.

Ensuing action by the originator depends on the payment method he selected. As described above, he may be taken to a web site to use an electronic payment system with which he has an account, his credit card details may be solicited, he may perform an in-app payment via the marketplace or vendor where he obtained the application, etc.

Figure 5D:
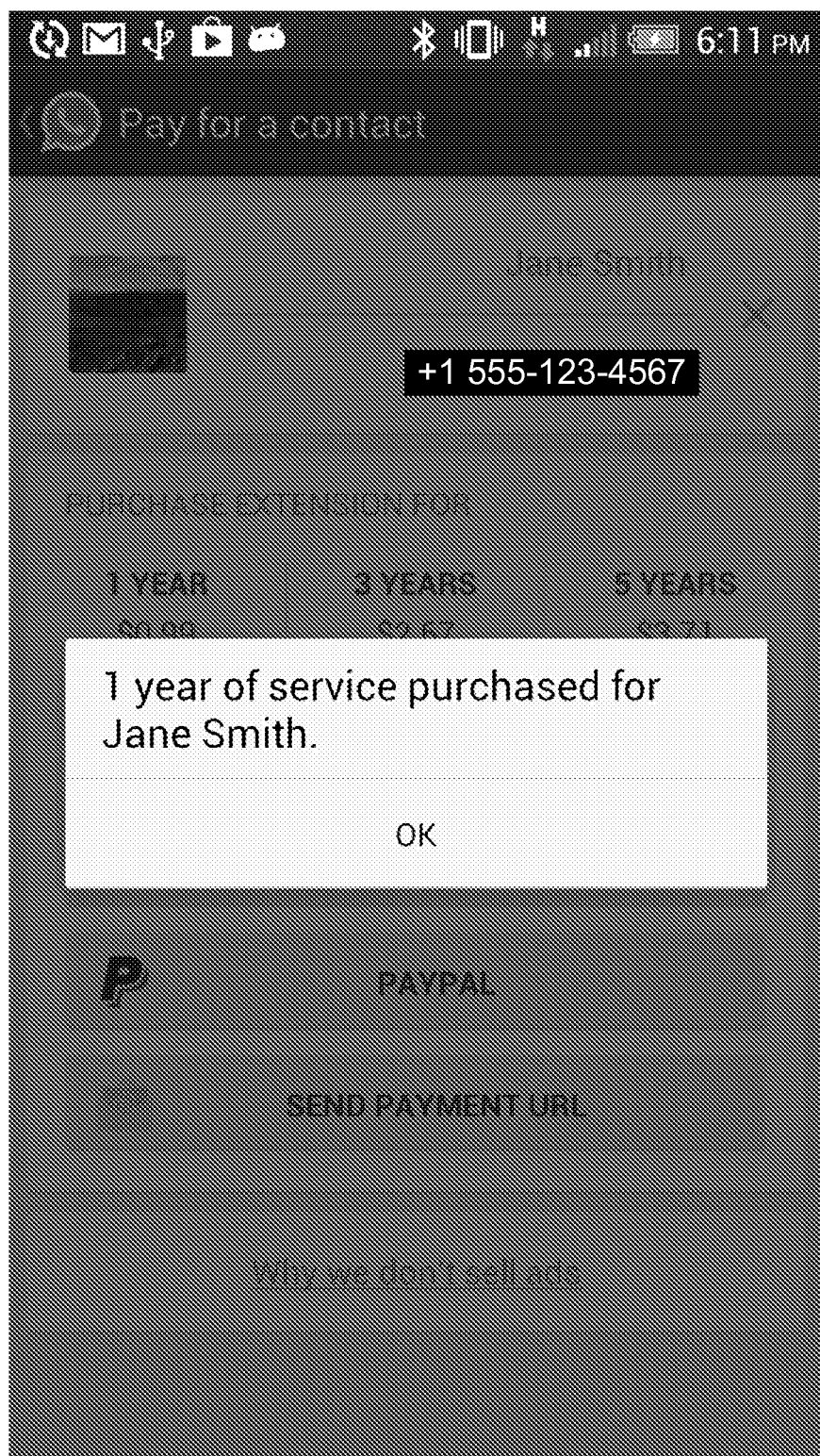
Figure 5E:
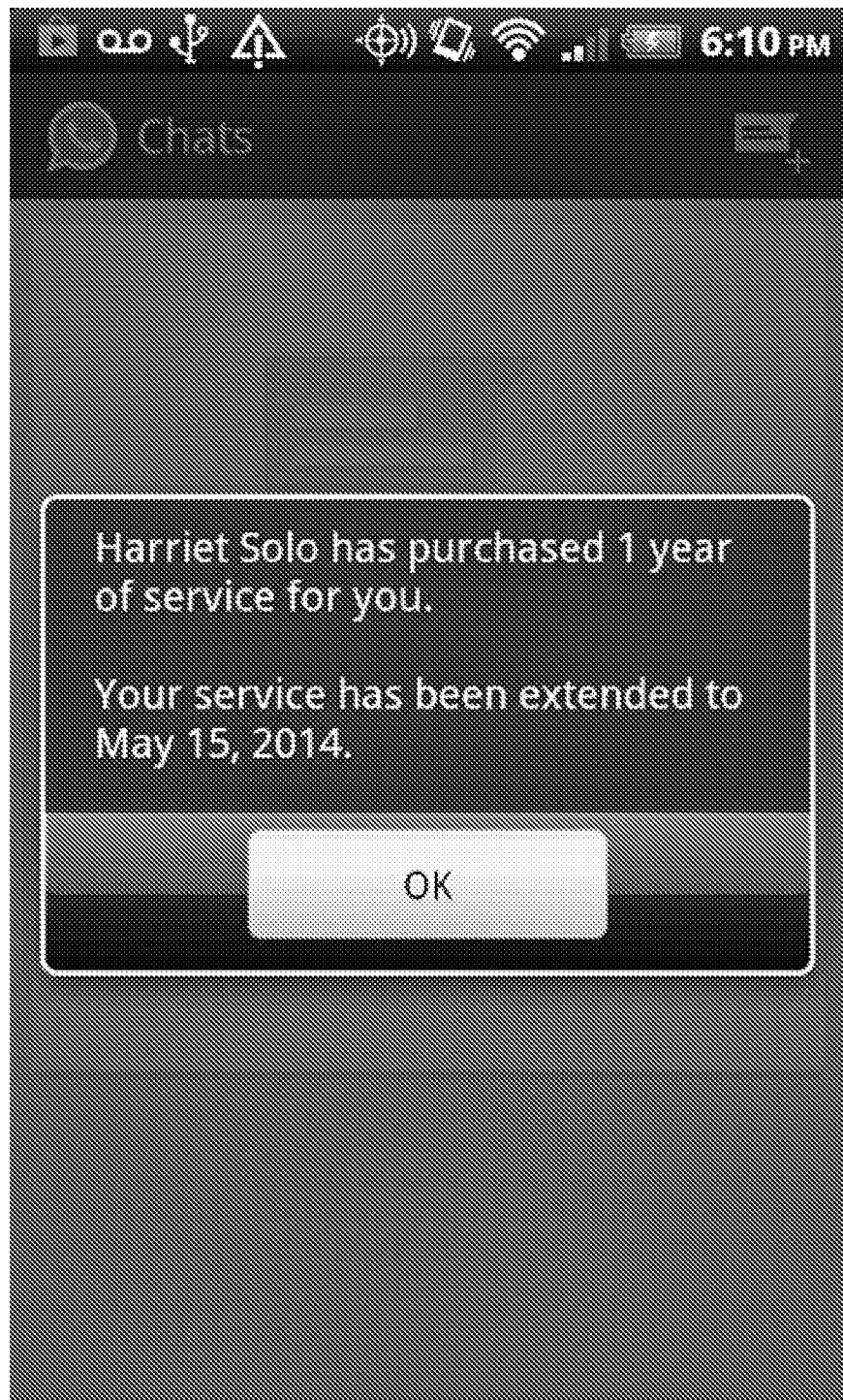

Depending on the payment method, and the speed with which it transpires, the originator may receive confirmation of his purchase before or without leaving the Pay screen, as shown in FIG. 5D. Further, each recipient of the originator's gift may receive a notification such as that shown in Notification screen 520 of FIG. 5E.

Figure 6:
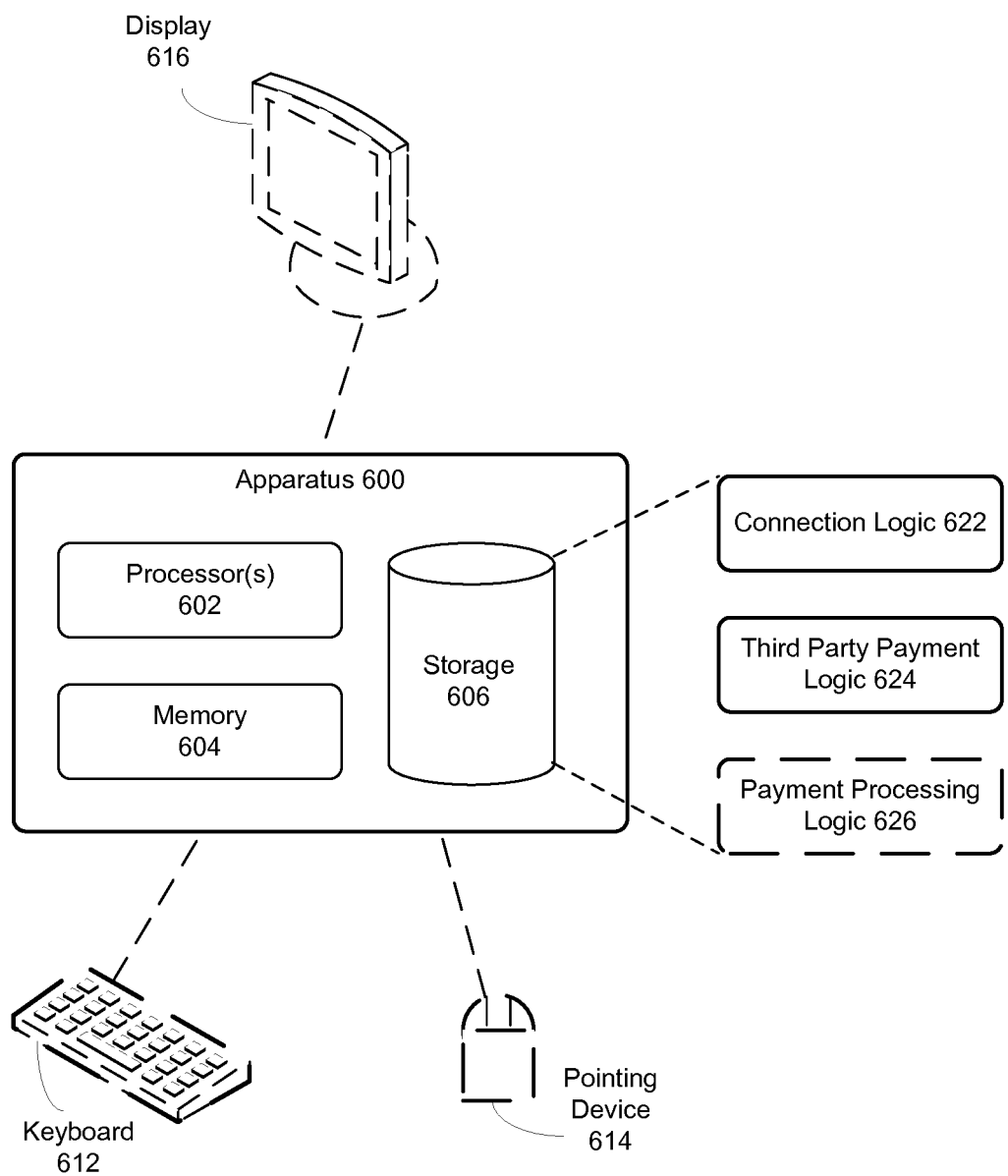
FIG. 6 depicts an apparatus for facilitating payment of a third-party's online subscription, in accordance with some embodiments.

FIG. 6 is a block diagram of an apparatus for supporting payment for a third party's use of an application, according to some embodiments. It will be understood that, in other embodiments, apparatus 600 may comprise multiple independent or semi-independent components for supporting such activity, such as communication servers, account servers, media servers, payment servers, and/or other components of an application host system.

Apparatus 600 of FIG. 6 comprises processor(s) 602, memory 604, and storage 606, which may comprise one or more optical and/or magnetic storage components. Apparatus 600 may be coupled (permanently or temporarily) to keyboard 612, pointing device 614, and display 616. The apparatus may include other components omitted in the interest of clarity, such as communication modules for communicating via wired and/or wireless communication links, interface components for interfacing with other external devices such as storage devices, a proxy server, a router, a load balancer, web servers, other system servers, etc.

Storage 606 of the apparatus stores logic that may be loaded into memory 604 for execution by processor(s) 602. Such logic includes connection logic 622, third party payment logic 624, and optional payment processing logic 626, in addition to application logic necessary to operate and support an application hosted by the apparatus and used by multiple users. Memory 604 and/or storage 606 may also store various data generated or used by apparatus 600, such as user statuses, user account statuses (e.g., expiration dates), a contact list, parameters for enabling communication with users' communication/computing devices, and so on.

Connection logic 622 comprises processor-executable instructions for receiving and managing connections with devices operated by users of a communication application hosted by apparatus 300. These instructions may allow the apparatus to receive connection requests, apply the correct protocol(s) to establish/maintain connections, terminate connections, exchange protocol messages that support the application, receive and deliver communications exchanged between users, etc.

Third party payment logic 624 comprises processor-executable instructions for receiving and implementing a user's decision or offer to pay for use of the application by one or more third parties. Logic 624 may therefore identify eligible recipients, verify a recipient's eligibility, receive verification of payment, apply the gift(s) to the specified recipient(s), notify the payor and/or the recipient(s), and/or take other action described herein.

Optional payment processing logic 626 comprises processor-executable instructions for processing a payor's payment or for supporting such processing. Illustratively, when an external payment method is selected by the payor, logic 626 may be uninvolved or may execute as required to perform the role of the entity on whose behalf the payment processor is operating—such as by redirecting an HTTP connection from the payor's device to an appropriate web site. However, in some implementations apparatus 600 may be more involved in the payment process if, for example, it accepts and processes credit cards to execute the payment.

In some embodiments, any or all of connection logic 622, third party payment logic 624, payment processing logic 626, and application logic are merged; in other embodiments they are further subdivided.

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system excluding transitory, propagating signals. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A computer-implemented method, comprising:
   receiving, from a first device associated with a first user and an executing application, an eligibility check identifying a first user and a third party, the eligibility check received at a application host system device distinct from the first device;
   determining, at the application host system device, whether the third party is eligible to have a new application subscription created by the first user;
   transmitting an eligibility indication from the application host system device to the first device based on the determining whether the third party is eligible to have the new application subscription created;
   receiving confirmation of payment by the first user;
   creating the new application subscription of the third party, in response to the confirmation of payment; and
   notifying the third party of the creation.

2. The method of claim 1, wherein the first user and the third party are associated with identities that include telephone numbers and are received in a communication associated with the executing application.

3. The method of claim 1, wherein determining whether the third party is eligible to have a new application subscription created by the first user comprises:
   identifying a type of device associated with the third party; and
   determining whether a version of the executing application is available for the identified type of device.

4. The method of claim 1, wherein determining whether the third party is eligible to have a new application subscription created by the first user comprises determining whether the third party is barred from use of the executing application.

5. The method of claim 1, wherein determining whether the third party is eligible to have a new application subscription created by the first user comprises checking a do-not-call list for the third party's phone number.

6. The method of claim 1, wherein determining whether the third party is eligible to have a new application subscription created by the first user comprises identifying other applications or services provided to the third party.

7. The method of claim 1, wherein notifying the third party of the creation comprises providing a uniform resource locator activatable on the third party's device to be connected to a host system of the executing application.

8. A non-transitory computer-readable storage medium storing instructions that, when executed by a hardware processor, cause the hardware processor to:
   receive, from a first device associated with a first user and an executing application, an eligibility check identifying a first user and a third party, the eligibility check received at a application host system device distinct from the first device;
   determine, at the application host system device, whether the third party is eligible to have a new application subscription created by the first user;
   transmit an eligibility indication from the application host system device to the first device based on the determining whether the third party is eligible to have the new application subscription created;
   receive confirmation of payment by the first user;
   create the new application subscription of the third party, in response to the confirmation of payment; and
   notify the third party of the creation.

9. The medium of claim 8, wherein the first user and the third party are associated with identities that include telephone numbers and are received in a communication associated with the executing application.

10. The medium of claim 8, wherein determining whether the third party is eligible to have a new application subscription created by the first user comprises:
    identifying a type of device associated with the third party; and
    determining whether a version of the executing application is available for the identified type of device.

11. The medium of claim 8, wherein determining whether the third party is eligible to have a new application subscription created by the first user comprises determining whether the third party is barred from use of the executing application.

12. The medium of claim 8, wherein determining whether the third party is eligible to have a new application subscription created by the first user comprises checking a do-not-call list for the third party's phone number.

13. The medium of claim 8, wherein determining whether the third party is eligible to have a new application subscription created by the first user comprises identifying other applications or services provided to the third party.

14. The medium of claim 8, wherein notifying the third party of the creation comprises providing a uniform resource locator activatable on the third party's device to be connected to a host system of the executing application.

15. A system comprising:
    one or more hardware processors;
    communication logic executable by the one or more hardware processors to exchange communications among users of an application, including a first user;
    connection logic executed by the one or more hardware processors to receive, from a first device associated with a first user and an executing application, an eligibility check identifying a first user and a third party, the eligibility check received at a application host system device distinct from the first device;
    account logic executable by the one or more hardware processors to:
    determine, at the application host system device, whether the third party is eligible to have a new application subscription created by the first user;
    transmit an eligibility indication from the application host system device to the first device based on the determining whether the third party is eligible to have the new application subscription created;
    receive confirmation of payment by the first user;
    create the new application subscription of the third party, in response to the confirmation of payment; and
    notify the third party of the creation.

16. The system of claim 15, wherein the first user and the third party are associated with identities that include telephone numbers and are received in a communication associated with the executing application.

17. The system of claim 15, wherein determining whether the third party is eligible to have a new application subscription created by the first user comprises:
   identifying a type of device associated with the third party; and
   determining whether a version of the executing application is available for the identified type of device.

18. The system of claim 15, wherein determining whether the third party is eligible to have a new application subscription created by the first user comprises determining whether the third party is barred from use of the executing application.

19. The system of claim 15, wherein determining whether the third party is eligible to have a new application subscription created by the first user comprises checking a do-not-call list for the third party's phone number.

20. The system of claim 15, wherein determining whether the third party is eligible to have a new application subscription created by the first user comprises identifying other applications or services provided to the third party.

* * * * *